United States Patent [19]

Johnson

[11] Patent Number: 5,161,240
[45] Date of Patent: Nov. 3, 1992

[54] ELECTRIC WALL SWITCH WITH GROUND FAULT PROTECTION

[76] Inventor: Ken C. Johnson, P.O. Box 781, La Jolla, Calif. 92038

[21] Appl. No.: 605,106

[22] Filed: Oct. 26, 1990

[51] Int. Cl.$^5$ ............................................. H02H 3/28
[52] U.S. Cl. ...................................... 361/42; 335/18; 174/53
[58] Field of Search ...................... 335/18, 20; 361/42, 361/45, 49; 174/53

[56] References Cited

U.S. PATENT DOCUMENTS

| | | | |
|---|---|---|---|
| 3,908,154 | 9/1975 | Gryctko | 361/45 |
| 4,010,431 | 3/1977 | Virani et al. | 335/18 |
| 4,013,929 | 3/1977 | Dietz et al. | 361/357 |
| 4,031,431 | 6/1977 | Gross | 307/326 |
| 4,034,266 | 7/1977 | Virani et al. | 361/42 |
| 4,053,815 | 10/1977 | Sircom | 361/42 |
| 4,077,056 | 2/1978 | Galiana | 361/50 |
| 4,081,852 | 3/1978 | Coley et al. | 361/45 |
| 4,567,544 | 1/1986 | Ronemus et al. | 361/399 |
| 4,630,015 | 12/1986 | Gernhardt et al. | 335/18 |
| 4,897,756 | 1/1990 | Zylstra | 361/44 |

FOREIGN PATENT DOCUMENTS 0092778  5/1984  Japan ..................................... 361/42

Primary Examiner—Steven L. Stephan
Assistant Examiner—Ben Davidson
Attorney, Agent, or Firm—Brown, Martin, Haller & McClain

[57] ABSTRACT

An electric wall switch has an outer casing on which incoming hot and cold line connectors and outgoing hot and cold load connectors are provided. A ground fault circuit interrupter is connected within the casing between the incoming and outgoing connectors for detecting ground faults and for opening the circuit between the incoming and outgoing connectors on detection of a ground fault. At least one of the outgoing hot load connectors is connected to the ground fault circuit interrupter via a switch for controlling powering of any device connected to that connector.

12 Claims, 1 Drawing Sheet

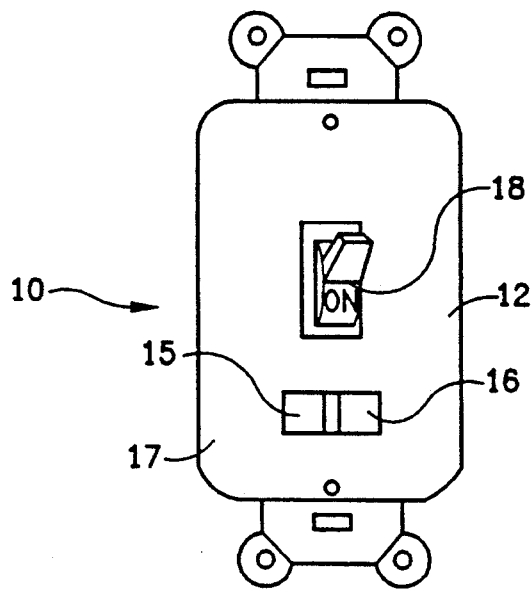
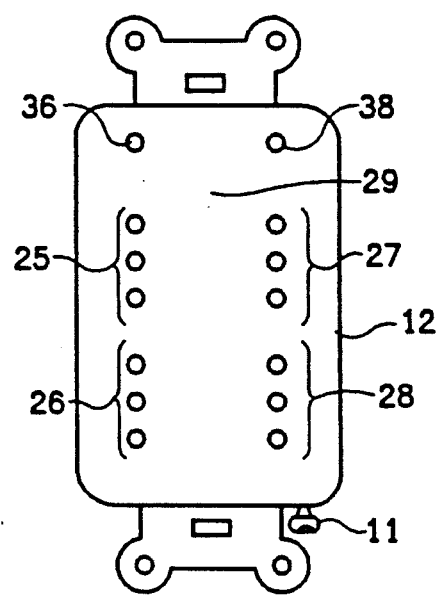
FIG. 1   FIG. 2
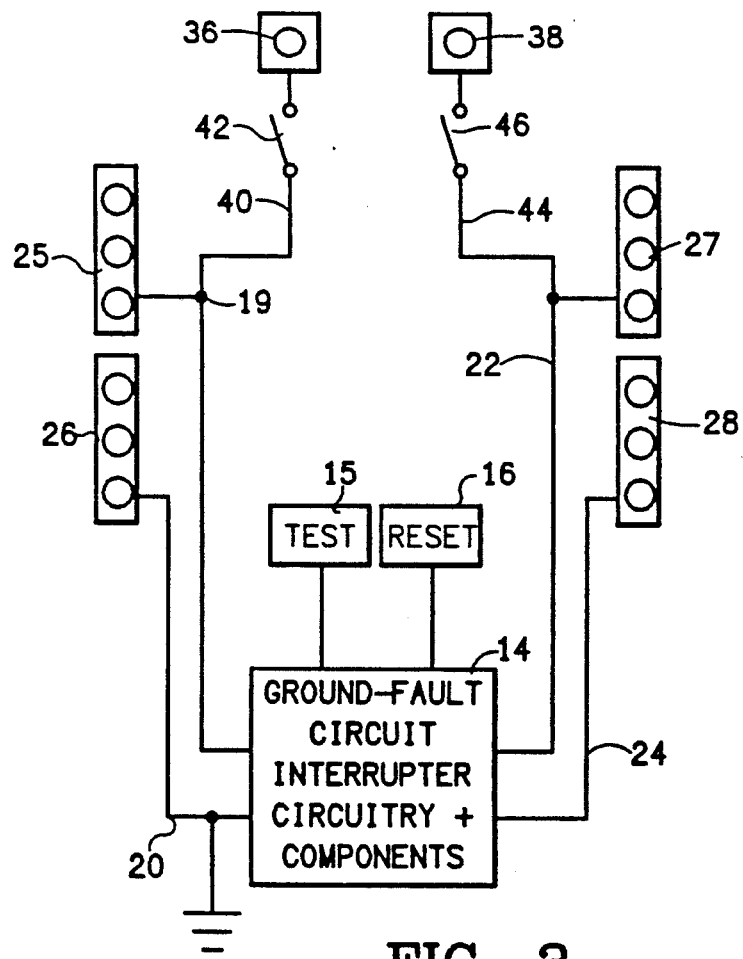
FIG. 3

ELECTRIC WALL SWITCH WITH GROUND FAULT PROTECTION

BACKGROUND OF THE INVENTION

This invention relates generally to electric wall switches of the type used to operate various electrical devices connected to the switches and is particularly directed to a wall switch with ground fault protection.

Ground fault circuit interrupters are used in the wiring of buildings in order to reduce the risk of accidental electrocution due to line-to-ground leakage, resulting in the grounded side of the line for a piece of electrical equipment or the casing of the equipment becoming hot, or live, producing a considerable shock hazard. Ground fault circuit interrupters are connected in series between the power source and a connector such as a wall socket in order to detect such leakages and cut off power to any connected equipment on detection of a ground fault. Certain electrical equipment is required to be protected by ground fault circuit interrupters, particularly any equipment in use near water, for example, outdoor pool lighting and bathroom electrical outputs. Once the interrupter has been activated or tripped by a ground fault, or inadvertently tripped, it must be reset after the problem has been resolved. This can be inconvenient in the case of outdoor equipment, for example, since the interrupter is typically located outdoors, so that the user has to go outdoors in order to reset it, and may be in relatively inaccessible areas, for example, under the jacuzzi tub. Typically, several circuit interrupters will be required at various locations, such as bathrooms, kitchen, outdoor pool or jacuzzi, and so on.

An electric wall receptacle with ground fault protection is described, for example, in U.S. Pat. No. 4,034,266 of Virani, et al. in which plug-in sockets for the pins of a standard electrical appliance are connected to a power source input to the receptacle via a ground fault interrupter circuit located in the wall receptacle.

SUMMARY OF THE INVENTION

It is an object of this invention to provide a new and improved electric wall switch.

According to the present invention, an electric wall switch is provided which comprises an outer receptacle or casing, the casing having a plurality of connectors including at least one hot line connector for connection to an AC power source, at least one cold line connector for connection to a grounded neutral conductor of the power source, at least one hot load connector and at least one cold load connector, a ground fault circuit interrupter in the casing connected between the hot and cold line connectors and the hot and cold load connectors, and a first manually operable switching device connected in series with the ground fault circuit interrupter and the hot load connector for controlling the supply of power via the ground fault circuit interrupter to any device connected to that hot load connector.

In the preferred embodiment of the invention, a plurality of hot load and cold load connectors are provided, with the manually operable switching device located between at least one of the hot load connectors and the ground fault circuit interrupter to provide a switchable connection, while the other connectors provide permanent protected feed-through connection, for example, for series connection to a permanently powered device, a wall socket, or another switch unit connected in series. Preferably, the switchable connector can be connected to one or more devices to be powered, such as light or other electrical devices. Preferably, a plurality of hot line and cold line connectors are also provided, and an additional, unprotected output connector is connected via an additional manually operable switching device directly to the incoming hot line connectors to provide an unprotected on-off switch for any device connected to the unprotected output connector.

In this way, the ground fault interrupter is located at a master switch for controlling powering of any connected devices, rather than separately at individual wall sockets, and the same junction allows the possibility of different types of power connection, including 1) on/off switch with no ground fault protection for devices connected to the output connector on the hot line side, 2) on/off switch with ground fault protection for devices connected to the output connector on the hot load side, 3) series connection with ground fault protection of devices connected directly to the hot and cold load connectors. An additional, direct line feed through connection may also be provided via a plurality of connectors on the line side. Preferably, a plurality of load connectors are also provided.

A suitable switch actuator is mounted on a front face of the wall switch casing for manual operation of the switching devices. This may be of the lever or toggle type or push button type, for example.

This arrangement provides a convenient master switch for location of ground fault protection circuitry which can be routed to numerous remote locations.

BRIEF DESCRIPTION OF THE DRAWINGS

The invention will be better understood from the following detailed description of a preferred embodiment of the invention, taken in conjunction with the accompanying drawings, in which like reference numerals refer to like parts, and in which:

FIG. 1 is a top plan view of a wall switch receptacle according to a preferred embodiment of the invention;

FIG. 2 is a bottom plan view illustrating the arrangement of input and output connections to the receptacle; and FIG. 3 is a schematic illustrating the electrical circuitry within the receptacle.

DESCRIPTION OF THE PREFERRED EMBODIMENT

The drawings illustrate an electric wall switch assembly 10 according to the preferred embodiment of the invention comprising an outer casing 12 in which a standard ground fault circuit interrupter module 14 is mounted. The module 14 may be of any standard type for detecting ground faults between hot and cold lines, such as that described in U.S. Pat. No. 4,013,929 of Dietz, in which contacts are moved into an open position to interrupt the connection of the power supply to a connected load in response to a ground fault. The circuitry necessary for ground fault detection is well known in the field, for example, as described in either U.S. Pat. No. 4,034,266 of Virani, et al. or 4,013,929 of Dietz referred to above, and will not be described in any more detail here. The module includes standard test and reset buttons 15, 16 associated with the ground fault interrupter module which are located on the front face 17 of the casing. A suitable manually operable switch operating member 18, which may be of the lever or toggle type as illustrated or of any alternative type, such as push button, is also mounted on the front face of casing 12. The casing is provided with the usual ground screw 11.

The circuit within casing 12 is illustrated in FIG. 3, and includes an incoming hot line conductor 19 and cold or neutral line conductor 20, and outgoing hot load conductor 22 and cold or neutral load conductor 24. Preferably, each of these conductors is connected to a plurality of individual connectors 25, 26, 27, and 28, respectively, which may be of the screw-in or plug-in type, as best seen in FIG. 2 on the rear face 29 of the receptacle to allow various devices to be powered from the same master unit. The ground fault circuit interrupter has inputs connected via conductors 19 and 20 to the hot and cold A/C source inputs 25 and 26, and via conductors 22 and 24 to the hot and cold load connectors 27 and 28 respectively, so as to detect ground faults on the load side between line 22 and line 24, in the standard fashion, and to open the circuit between the line side and the load side of the assembly in the event that a ground fault is detected.

Additionally, switchable plug-in connectors 36 and 38 on the rear face of the casing are connected to the line and load sides, respectively, of the circuit, as illustrated in FIG. 3. Connector 36 is connected via conductor 40 and on-off switch 42 to the hot line conductor 19, while connector 38 is connected via conductor 44 and on-off switch 46 to the hot load conductor 22, as seen in FIG. 3. Both on-off switches are controlled by toggle member 18, to provide a two pole, single throw switch. However separate switch operating levers or toggles may be provided for each switch 42 and 46, if desired. Preferably, each of the switchable connectors may be connected to more than one device to be powered via the switch, and may be of the quick lock wire connection type as illustrated on FIG. 2, or of the screw-in slide clamp type, for example.

With this arrangement, any device connected in series with hot and cold load connectors 27, 28 will be protected against ground faults and will not be operated by the switch. Any device connected to switchable connector 36 and having a neutral connected to cold connector 26 will be connected directly to the incoming power connection 19 and will be unprotected by the ground fault circuit interrupter, and the toggle switch will operate as a standard wall switch for such devices. And device connected to switchable connector 38 and with a neutral connected to cold load connector 28 will be protected against ground faults. Thus, this switch assembly provides a multi-function wall unit which can directly switch on or off a connected device selectively with or without ground fault protection, and at the same time provides a direct, protected feed through connection for subsequent circuitry. Devices requiring ground fault protection can therefore be connected either to any of connectors 27, 28 or to connectors 38, 28, depending on whether a switchable connection is needed, while devices which do not need ground fault protection can be powered directly from the same unit by connection to unprotected, switchable connector 36 and neutral at 26.

This arrangement can simplify circuit design in wiring building interior and exterior electrical devices, since instead of requiring separate ground fault circuit interrupters at many different locations in each circuit, a single master switch with in-built ground fault protection may be used in each 15 amp or 20 amp circuit to provide the necessary protection for any outlet or fixture adjacent a water source in that circuit. This is much more convenient since one or more master switches with in-built ground fault circuit protection can be provided at convenient locations in the wiring of a building, instead of requiring ground fault protectors at inconvenient locations. For example, bathroom lighting and wall socket fixtures could be routed to the protected, direct hot load connectors either directly or via additional, standard wall switch units, while normal room interior lighting could be connected to unprotected connector 36 or via wall switch units to one of the incoming line connectors 25. Plugs within six feet of a kitchen sink or any basin or tub could also be connected to protected connectors 27, 28 or 38. Thus, a single master switch unit could protect the required outlets close to a water source while directly switching overhead lights in the kitchen area, for example. Outdoor lighting needing protection, for example, lighting in or adjacent pools, ponds, or jacuzzis, could be routed to a protected switchable connector 38 either directly or via an additional switch unit.

Although a preferred embodiment of the invention has been described above by way of example only, it will be understood by those skilled in the field that modifications may be made to the disclosed embodiment without departing from the scope of the invention, which is defined by the appended claims.

I claim:

1. An electric wall switch assembly, comprising:
    an outer casing;
    hot and cold input line connectors on said casing for connection to an AC power supply;
    hot and cold output load connectors on an outer side of said casing for connection of selected external devices to said assembly;
    the output load connectors including at least one cold output load connector and a plurality of hot output load connectors;
    at least one of said hot load connectors comprising a switchable connector;
    a ground fault circuit interrupter in said casing having a line side and a load side, the ground fault circuit interrupter having hot and cold line inputs on said line side connected to said respective hot and cold input line connectors and hot and cold load outputs on said load side connected to said respective hot and cold output load connectors, the circuit comprising means for detecting ground faults between said hot and cold load outputs and means for opening said circuit in response to detection of a ground fault;
    manually operable switch means on the load side connected in series between said ground fault circuit interrupter and at least one hot output load connector for controlling the supply of power via said ground fault circuit interrupter to a device connected to said one output load connector; and
    at least one of said output load connectors being connected directly to said hot load output of said ground fault circuit interrupter bypassing said switch means and at least one of said output load connectors being connected to said hot load output via said switch means.

2. The switch assembly as claimed in claim 1, including a plurality of output load connectors connected directly to said hot load output of said ground fault circuit interrupter bypassing said switch means.

3. The switch assembly as claimed in claim 1, including a plurality of incoming hot line and cold line connectors.

4. An electric wall switch assembly, comprising:
   an outer casing;
   hot and cold input line connectors on said casing for connection to an AC power supply;
   hot and cold output load connectors on said casing;
   at least one of said hot load connectors comprising a switchable connector; a ground fault circuit interrupter in said casing having hot and cold line inputs connected to said respective hot and cold input line connectors and hot and cold load outputs connected to said respective hot and cold output load connectors, the circuit comprising means for detecting ground faults between said hot and cold load outputs and means for opening said circuit in response to detection of ground fault;
   first manually operable switch means connected in series between said ground fault circuit interrupter and at least one hot output load connector for controlling the supply of power via said ground fault circuit interrupter to a device connected to said one output load connector; and
   an additional, unprotected output connector on said casing and second manually operable switch means connected between said hot line connector and said additional, unprotected output connector for controlling power supply directly to said unprotected output connector.

5. The switch assembly as claimed in claim 4, wherein said switch means on the line and load sides comprise a two pole, single throw switch.

6. The switch assembly as claimed in claim 1, including at least one switch operating member on a front face of said casing for controlling operation of said switch means.

7. An electric wall switch assembly, comprising:
   an outer casing;
   at least one incoming hot line connector and one incoming cold line connector;
   a plurality of output connectors on an outer surface of said casing for connection to selected devices to be powered from said switch assembly, said output connectors including at least one outgoing hot load connector and one outgoing cold load connector, and at least one outgoing switch controlled connector;
   ground fault circuit interrupter means in said casing connected between said incoming and outgoing connectors for detecting ground faults between said hot and cold load connectors and for opening the circuit between said incoming and outgoing connectors on detection of a ground fault; and
   manually operable switch means in said casing connected between said circuit interrupter means and said switch controlled connector for controlling powering of any device connected to said switch controlled connector.

8. The switch assembly as claimed in claim 7, including a plurality of hot and cold load connectors.

9. The switch assembly as claimed in claim 8, wherein said switch controlled connector comprises connection means for a plurality of devices to be powered from said switch assembly.

10. The switch assembly as claimed in claim 7, including a plurality of hot and cold line connectors.

11. An electric wall switch assembly, comprising:
    an outer casing;
    at least one incoming hot line connector and one incoming cold line connector;
    at least one outgoing hot load connector and one outgoing cold load connector;
    at least one outgoing switch controlled connector; ground fault circuit interrupter means in said casing connected between said incoming and outgoing connectors for detecting ground faults between said hot and cold load connectors and for opening the circuit between said incoming and outgoing connectors on detection of a ground fault;
    manually operable switch means in said casing connected between said circuit interrupter means and said switch controlled connector for controlling powering of any device connected to said switch controlled connector; and
    an additional outgoing switchable connector and additional manually operable switch means in said casing between said hot line connector and said additional connector for controlling supply of power directly to devices connected to said additional connector.

12. The assembly as claimed in claim 11, including a manually operable switch operating member on the front of said casing for operating both of said switch means.

* * * * *